June 26, 1962    R. HIMELSBAUGH    3,041,443
APPARATUS FOR AND METHOD OF WELDING CONTACTS WITHIN A CASE
Filed Aug. 21, 1959    3 Sheets-Sheet 2

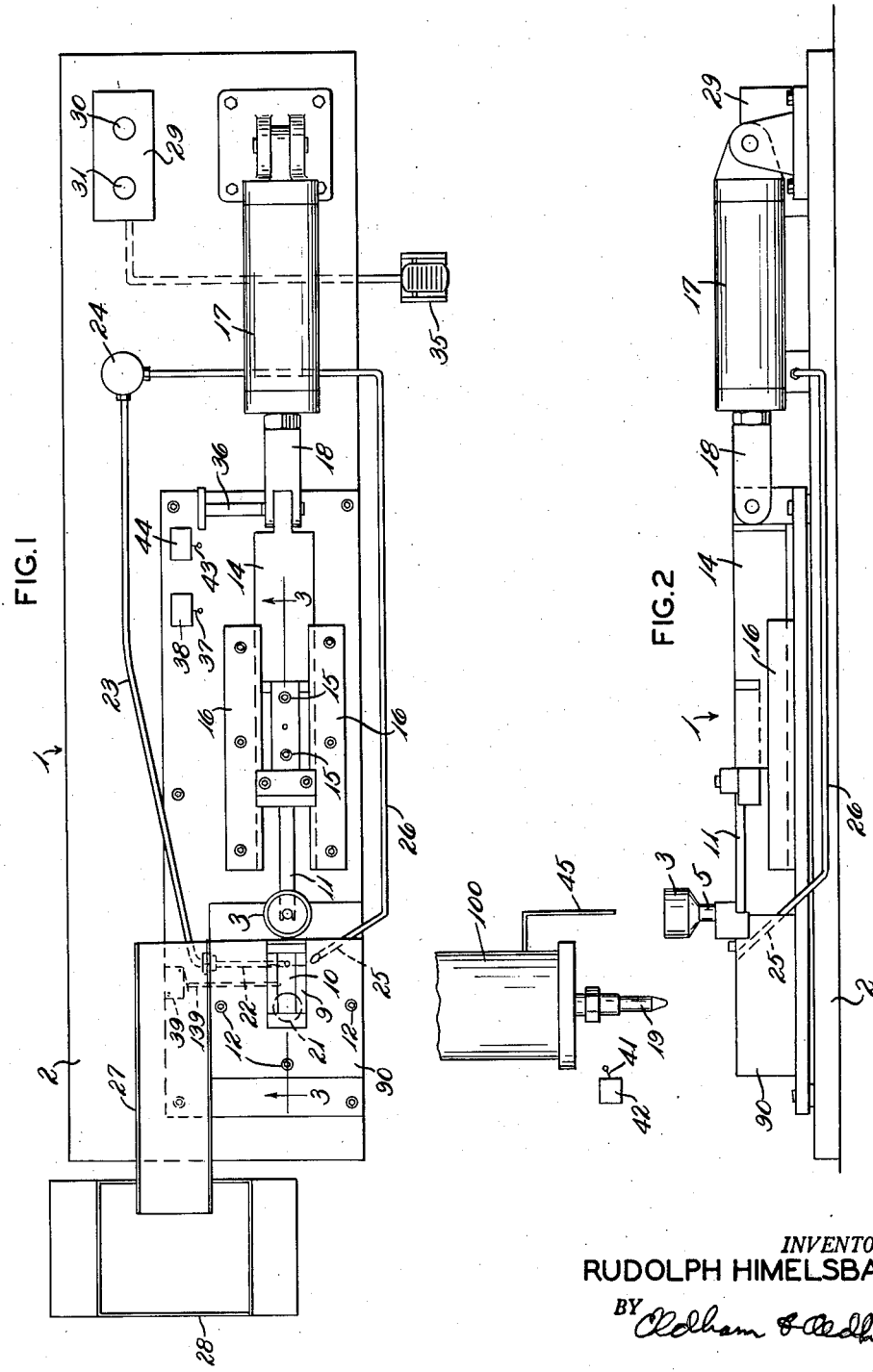

INVENTOR.
RUDOLPH HIMELSBAUGH
BY Oldham & Oldham
ATTYS.

June 26, 1962 R. HIMELSBAUGH 3,041,443
APPARATUS FOR AND METHOD OF WELDING CONTACTS WITHIN A CASE
Filed Aug. 21, 1959 3 Sheets-Sheet 3

INVENTOR.
RUDOLPH HIMELSBAUGH
BY Aldham & Aldham
ATTYS.

United States Patent Office 3,041,443
Patented June 26, 1962

3,041,443
APPARATUS FOR AND METHOD OF WELDING
CONTACTS WITHIN A CASE
Rudolph Himelsbaugh, Parma, Ohio, assignor to Mechanical Industries Production Company, Akron, Ohio, a corporation of Ohio
Filed Aug. 21, 1959, Ser. No. 835,245
13 Claims. (Cl. 219—79)

The present invention relates to apparatus and method for welding electrical contacts within a case, such as would be used in motor protectors, or other small electrical control articles, and to the article produced.

The general object of the present invention is to provide a novel and relatively uncomplicated apparatus for positioning a small tubular metal case in a desired location, to move an electric contact into the bore of the case from an open end thereof, and thereafter to weld the contact to the case.

Another object of the invention is to provide apparatus that has an automatic cycling action when once actuated by the operator of the apparatus so as to insert an electrical contact into a case and weld it therein, withdraw the carrying apparatus that brings the contact into operative engagement with the case, and to eject the case with the contact welded therein.

A further object of the invention is to provide a novel and improved method and apparatus for automatically depositing one electrical contact onto a contact carrier member, to automatically insert the contact into desired association with a prepositioned tubular electrical case, and to remove the case having a contact welded thereto by an air jet pressure after the weld operation on the contact has been performed.

Another object of the invention is to provide a novel article for use in making small electrical parts.

The foregoing and other objects and advantages of the invention will be made more apparent as the specification proceeds.

Particular attention now is directed to the accompanying drawings, wherein:

FIG. 1 is a plan view of the apparatus embodying the principles of the invention and adapted to practice the method of the invention;

FIG. 2 is a side elevation of the apparatus of FIG. 1;

When referring to corresponding members shown in the drawings and referred to in the specification, corresponding numerals are used to facilitate comparison therebetween.

In general, the present invention relates to apparatus and methods for welding contacts within metal cases and where the apparatus includes hopper means for storing a plurality of contacts therein, a discharge chute connecting to the hopper to receive only one vertical row of stacked contacts therefrom, a transfer arbor with a contact receiving recess therein positioned below the discharge chute to receive contacts one at a time therefrom when the recess in the arbor is moved in under the discharge chute, fixture means positioned adjacent the discharge chute to receive and position a case thereon with its open end facing towards the transfer arbor, cylinder and control means engaging the transfer arbor to move it into a case on the fixture means and back out again after weld action is effected to bring the recess under the discharge chute but to prevent discharge of other contacts from such chute, a weld electrode positioned to move to engage the case on the fixture means to force the case against the contact on the transfer arbor when within the case, and a control means operatively connected to the electrodes to supply welding energy thereto to weld a contact to the inner wall of the flattened section of the case. Automatic control means also are provided by the apparatus to complete an operative weld cycle when once actuated.

Figure 3:
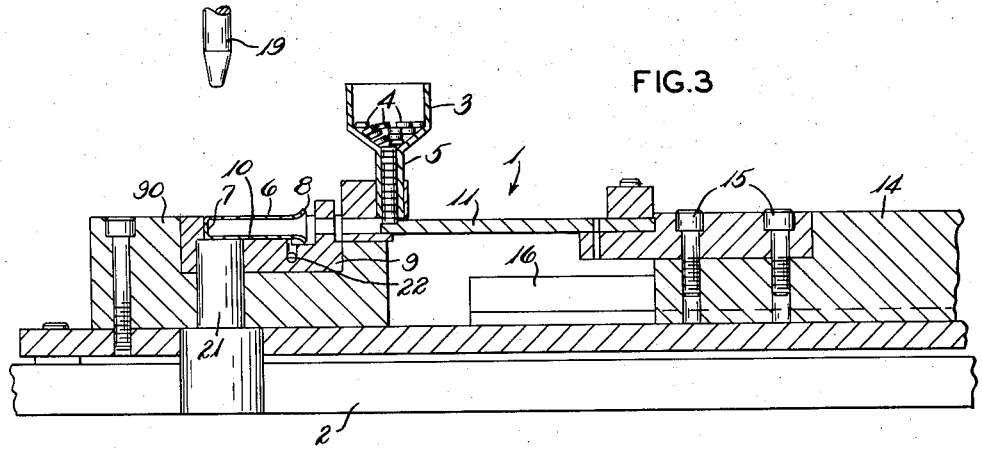
FIG. 3 is a fragmentary enlarged vertical section of a portion of the apparatus taken on line 3—3 of FIG. 1 showing the apparatus prior to inserting a contact into a case for positioning therein.

Referring more specifically now to the details of the structure shown in the drawings, a contact welding apparatus of the invention is indicated as a whole by the numeral 1. Such contact welding apparatus 1 includes a frame 2 that has a hopper 3 secured thereto for receiving a plurality of the small contacts 4 therein. These contacts are of any conventional construction and normally comprise flat metal discs of silver, or other good electrical conductive material. The hopper 3 has a discharge chute 5 provided thereon, as best shown in FIG. 3, and with the discharge chute 5 being of such a size to receive the contacts 4 therein in vertical stacked relationship, and the discharge chute and hopper are so designed and connected that contacts feed into the discharge chute only in horizontal, stacked relation.

It is an important feature of the invention that a member is provided to receive contacts 4 individually from the discharge chute 5 and to transfer them into a metal case 6 to be welded to the inner surface thereof. The case 6 is shown with a closed end 7 and an open end 8. The case 6 is made from any conventional material, such as copper or suitable alloys thereof, and is usually quite small, being for example, about an inch long and being either of circular or oval shape in section and having a maximum width or diameter of approximately 3/16 of an inch. In all events, the case 6 is adapted to be positioned in a suitable weld fixture, in this instance comprising an insulation block 9 that has a recess 10 provided therein for receiving and positioning the case 6 in a desired fixed position. The open end 8 of the case 6 is facing the discharge chute 5 so that a transfer arbor 11 can be moved along its longitudinal axis from a position below the discharge chute 5 to a position within the case 6 on the insulation block 9. This insulation block 9 is secured to a block 90, attached in any desired manner to the frame 2, as by means of cap screws 12. The transfer arbor 11 has a contact receiving recess 13 provided in the leading end thereof. The transfer arbor 11 is secured to a positioning block 14 by conventional means, including cap screws 15, which block 14 is slidably engaged with guides 16 carried by or secured to the frame 2 in a conventional manner. The block 14 is positioned for reciprocating movement on the frame 2 along the longitudinal axis thereof for moving the transfer arbor 11 to and from engagement with a case carried by the insulating block 9. Movement of the transfer arbor 11 is provided by and controlled through an air cylinder 17, or other equivalent member, carried by the frame 2 and engaging the block 14 by means of a piston rod 18. Hence by proper control of the air cylinder 17 or equivalent drive means connecting to the piston rod 18, the transfer arbor can be moved through its operative longitudinal cycle of movement, as hereinafter described.

It should be noted that the transfer arbor 11, except for the recess 13 thereof, is of such size as to bear against the lower end of the discharge chute 5 and prevent any other contacts 4 from moving therefrom after one contact has been deposited in the recess 13 and the transfer arbor is moved towards the case 6 on the insulation block 9.

Figure 4:
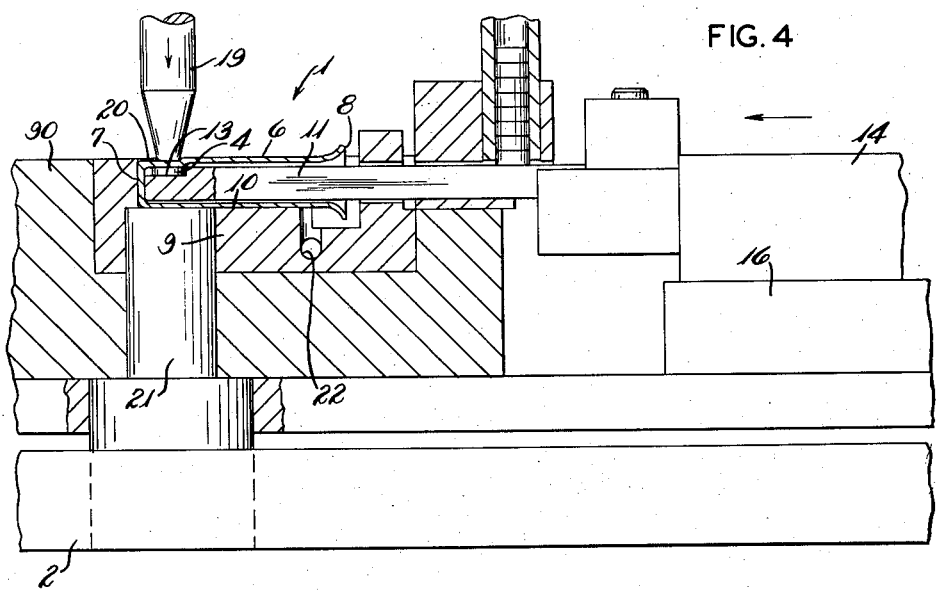
FIG. 4 is an enlarged view, similar to FIG. 3, but with the apparatus being set for weld action.

After the transfer arbor 11 has been telescoped into engagement with the case 6 on the insulation block 9, the apparatus is adapted to bring a conventional welded electrode 19 down into pressure engagement with the upper surface of the case 6. The case 6 either has a flattened area 20 adjacent the closed end of the case or else it tapers inwardly so that the case has good engagement with the contact 4 positioned on the transfer arbor within the case for flow of electrical current therebetween. The case 6 has a reduced inner diameter at the flattened area 20 therein. Obviously some clearance is provided for the transfer arbor 11 on its starting movement into the case 6. In all events, one localized area of the case will effectively engage the contact 4 when in the position shown in FIG. 4. A second electrode 21 normally is built into the contact welding apparatus 1. This second electrode 21 is positioned in the frame 1 to extend up through the insulation block 9 and have its upper surface extend into and form a portion of the bottom of the recess 10 so that the second electrode 21 is in good electrical contact with the case 6 positioned on the insulation block. Hence when electrical energy is supplied to the electrodes 19 and 21, as hereinafter described, the current flow through the case 6 and conduction heating will effect the welding, brazing or similar securing action to secure the contact 4 to the inner surface of the flattened area 20 of the case. It is believed that the electrical resistance between the case 6 and the upper electrode 19 materially aids in obtaining what is considered to be a resistance brazing of the contact 4 to the case. Even though the transfer arbor 11 is metallic, no bond is formed between the contact 4 and the arbor by the grazing action effected on the contact. Thereafter, the transfer arbor 11 is pulled back longitudinally from the case 6 and another contact 4 will be automatically deposited into the contact receiving recess 13 in the transfer arbor for the next brazing cycle. Brazing or fluxing materials, if necessary, may be supplied to the cases, or contacts, as desired.

After the transfer arbor 11 has been withdrawn from a case when a contact has been welded thereto, an air jet is provided to eject the case 6 from the insulation block 9. Thus a bore 22 is provided in the insulation block 9 and its connects to the bottom of the recess 10 therein. The bore 22 naturally extends to the outer surface of the insulation block 9 and connects to a conventional tube or conduit 23 that in turn extends to a member, such as a solenoid operated valve 24, for controlling the supply of air to the bore 22 so that, when desired, a stream or jet of air can be forced from the bore 22 to lift a case 6 in the recess 10 up out of the recess for discharge action. Normally a second bore 25 is also provided in the block 90 and it terminates at a point adjacent the recess 10 in the insulation block. Such second bore 25 connects to an air supply tube 26 and the bore 25 is positioned for discharge of an air jet or stream therefrom to engage a case 6 when once lifted up out of the recess by the air stream from the bore 22. Such second air stream from the bore 25 is of sufficient strength that it will blast or force the case 6 to move along with the air stream issuing from the bore 25 to any desired collection receptacle, such as a chute 27, positioned adjacent the insulation block 9 to catch the discharged cases 6 therein and let them slide by gravity down into a storage hopper or box 28.

*Method of Operation and Control*

The operation of the contact welding apparatus 1 of the invention is primarily controlled by means of an air valve 29. This air valve 29 has two solenoids 30 and 31 associated with it that regulate the positioning of the control means in the air valve for flow of air to the air cylinder 17 and other portions of the apparatus for control action. An air pressure supply tube 32 connects to the air valve 29, and power is supplied to the control means in the apparatus by power supply leads 33 and 34. The power supply lead 33 connects directly to the solenoid 30, whereas the power supply lead 34 is connected through a control switch 35 to complete the energization circuit for the solenoid 30. This control switch 35 usually is of the foot-operated type and is positioned in any convenient association with the contact welding apparatus 1 so that the operator can actuate the apparatus when a case 6 has been properly positioned for welding a contact therein. Actuation of the control switch 35 will set the air valve 29 so that the air cylinder 17 moves the piston rod 18 towards the case 6 on the insulation block 9, and as the piston rod moves along its fixed path, an arm 36 secured thereto strikes the control arm 37 of a switch 38 to close such switch 38. The switch 38 connects to a safety switch 39 closed by a control pin 139 slidably carried by the block 90 through the safety switch 39 to a weld timer 40. This weld timer 40 is of conventional construction and is adapted to set up an automatically operating weld cycle by which a weld head 100 is moved down into operative engagement, through the electrode 19, with one of the cases 6 positioned for weld action on the insulation block. Next the weld timer 40 closes contacts for supply of welding current or energy to the electrodes 19 and 21 for a predetermined weld period after which the weld head 100 will be raised back up to an inoperative position, all through one energization or closing of the switch 38. The control pin 139 extends through the insulation bock 9 to the recess 10 and is moved to a switch closing position by a case 6 placed in the recess 10. When the weld head 100 moves vertically upwardly, it contacts the control arm 41 of a further switch 42. Such switch 42 is operatively connected to the second solenoid 31 to energize it when the switch 42 is closed and cause the air valve 29 to be moved to another position at which time air is supplied to the air cylinder 17 to cause it to retract the piston rod 18. As such piston rod is retracted, the bracket arm 36 thereon strikes the operative arm 43 of a third control switch 44 and closes an operative circuit therethrough. Such control switch 44 is operatively connected to the control valve 24 to supply compressed air or similar material to the bores 22 and 25 to supply an air blast thereto to eject or discharge the case 6 from the recess in the insulation block 9.

After the piston rod 18 and the associated piston in the air cylinder 17 have been returned to their starting positions, the apparatus is then ready for another operative cycle. At such condition, the operator of the apparatus must again, usually manually, position one of the cases 6 in the recess 10 and then close the control switch 35. This will start another cycle of operation of the apparatus by which a further weld action is obtained.

As indicated in FIG. 2, usually the weld head 100 has a special bracket or finger 45 secured thereto and extending therefrom. This bracket or finger 45 is moved down into the open upper end of the hopper 3 each time the weld head is actuated or brought downwardly for weld action. Such slight stirring action obtained on the contacts 4 by the arm or finger 45 extending into the hopper 3 aids in preventing such contacts from collecting in any improper manner within the hopper and maintains a steady feed of the stacked contacts from the discharge chute 5.

The case 6 usually is made by a deep drawing method and it has a permanently closed end and an open end.

Figure 6:
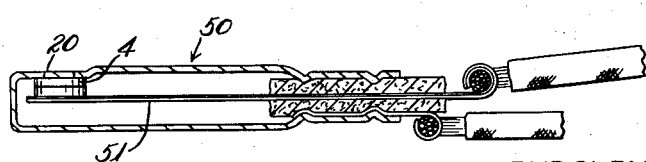
FIG. 6 is an enlarged vertical section through a motor protector embodying a novel case and contact unit of the invention.
Figure 5:
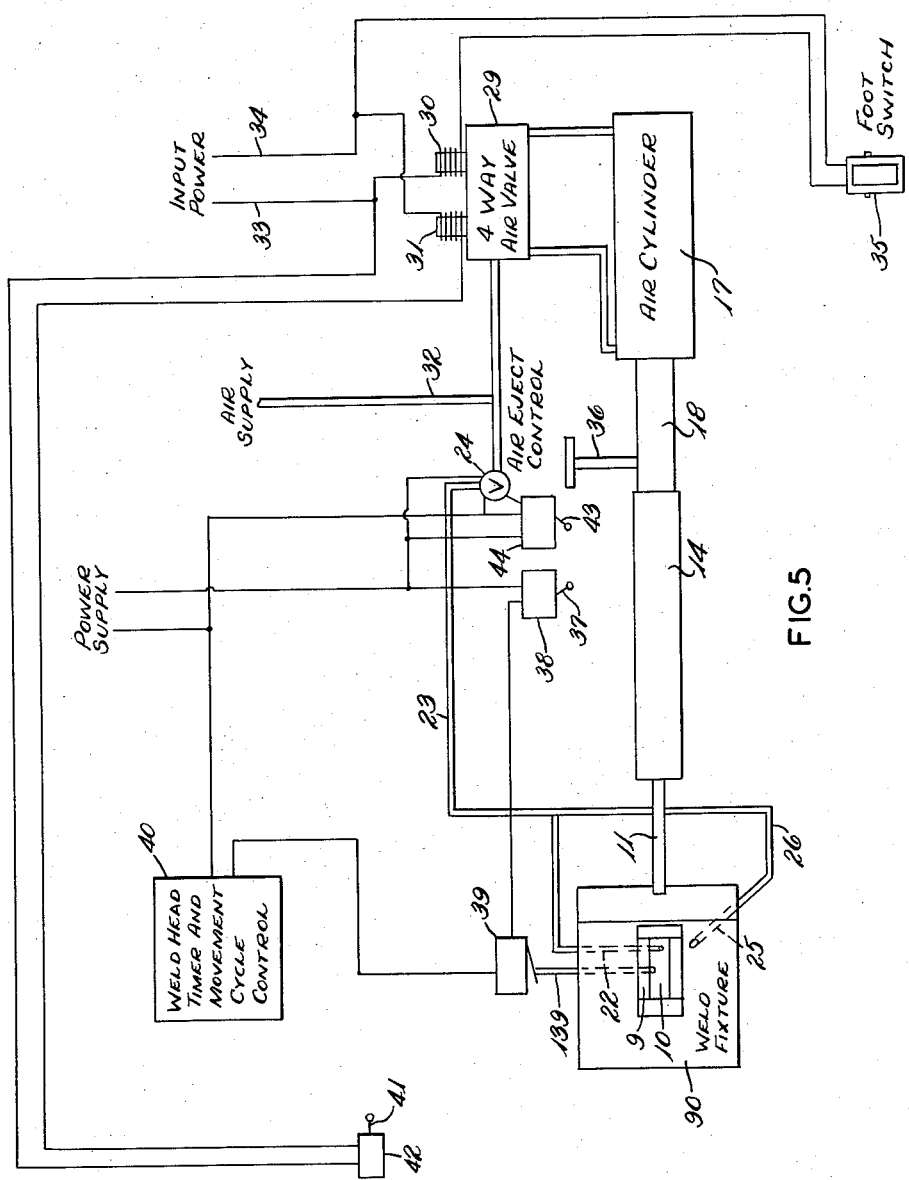
FIG. 5 is a schematic diagram of the apparatus and the various control means for providing automatic cycling action when once actuated.

FIG. 6 shows a motor protector 50, which is an example of a small electrical part or device such as a thermostat, fuse or other member, made from the novel case 6 having a contact 4 secured to the inner wall thereof adjacent the closed end of the case. A bimetal strip 51 is positioned in and insulated from the case 6 in a known manner. Conventional terminal means and any other suitable members used in articles of this type complete the motor protector 50.

From the foregoing, it will be seen that an automatically functioning weld cycle action is obtained by the apparatus and method of the invention. This apparatus is relatively uncomplicated but positive acting to obtain a very satisfactory weld action to secure a small contact within a case, and with such contact being positioned adjacent the closed end of the case in the style of cases shown in the drawing. It will be seen that the control arms provided on the various switches 38, 42 and 44 are of the type that they are only actuated by movement in one predetermined direction and that they do not effect any switch closing or actuation action when actuated in the opposite direction. The apparatus of the invention is compact, easily operated and is relatively inexpensive. A novel tubular case with a contact welded therein is also provided by the invention. Hence it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. Apparatus for welding contacts within metal cases having an open end comprising hopper means for storing a plurality of contacts, a discharge chute connecting to said hopper means to receive only one vertical row of stacked contacts therein, a transfer arbor with a contact receiving recess therein positioned below said discharge chute to receive contacts one at a time therefrom when said recess is moved in under said discharge chute, fixture means positioned adjacent said discharge chute to receive and position a case with its open end facing said transfer arbor, means engaging said transfer arbor to move it into a case on said fixture means and back out with said recess positioned under said discharge chute, a weld electrode positioned to move to engage a case on said fixture means to force the case against a contact on said transfer arbor within said case, a second electrode operatively carried by said fixture means and engaging a case positioned on said fixture means, and means connected to said electrodes to supply welding energy thereto after said case has been flattened to weld said contact to the inner wall of said case.

2. Apparatus for welding contacts within metal cases having an open end comprising hopper means for storing a plurality of contacts, a discharge chute connecting to said hopper means to receive only one vertical row of stacked contacts therein, a transfer arbor with a contact receiving recess in an upper end portion thereof positioned below said discharge chute to receive contacts one at a time therefrom when said recess is moved in under said discharge chute, fixture means positioned adjacent said discharge chute to receive and position a case with its open end facing said transfer arbor, means engaging said transfer arbor to move said recessed upper end portion into a case on said fixture means and back out with said recess positioned under said discharge chute, said transfer arbor being positioned to have its upper surface immediately adjacent the lower end of said discharge chute at all times in the movement of said transfer arbor, a weld electrode positioned to move to engage a case on said fixture means, and means connected to said electrode to supply welding energy thereto after said case has been flattened to weld said contact to the inner wall of said case.

3. Apparatus for welding contacts within metal cases having an open end comprising hopper means for storing a plurality of contacts, a discharge chute connecting to said hopper means to receive only one vertical row of stacked contacts therein, a transfer arbor with a contact receiving recess in an upper portion thereof positioned below said discharge chute to receive contacts one at a time therefrom when said recess is moved in under said discharge chute, fixture means positioned adjacent said discharge chute to receive and position a case with its open end facing said transfer arbor, means engaging said transfer arbor to move it into a case on said fixture means and back out with said recess positioned under said discharge chute, a weld electrode positioned to move to engage a case on said fixture means, means connected to said electrode to supply welding energy thereto after said case has been flattened to weld said contact to the inner wall of said case, and switch means to prevent action of said weld electrode connected in a control circuit therefor and operatively associated with said fixture means to be closed by a case positioned on said fixture means.

4. Apparatus for welding contacts within a case and comprising a frame, a member carried by said frame and having a seat provided therein for a case, an arbor having a recess thereon for carrying a contact thereon, means engaging said arbor and securing it to said frame for reciprocation to and from association with a case positioned on said member, means operatively engaging said arbor to deposit a contact thereon when said arbor is out of engagement with a said case on said member, said arbor being positioned to be moved into and out of a case on said member, and means operatively associated with said frame and a case on said member to engage opposite portions thereof adjacent said contact positioned within a said case to pass electrical energy through said case and said contact to secure said contact to said case.

5. Apparatus for welding contacts within a case and comprising a frame, an insulation member carried by said frame and having a seat provided therein for a case, an arbor having a recess thereon for carrying a contact thereon, means engaging said arbor and securing it to said frame for reciprocation to and from association with a case positioned on said insulation member, a contact being received on said arbor when out of engagement with a said case on said insulation member, said arbor being positioned to be moved into and out of a case on said insulation member, and welding means operatively associated with said frame and a said case on said insulation member to engage opposite portions thereof at the section of said case having a said contact positioned therein to weld said contact to said case.

6. Apparatus for welding contacts within a case and comprising a frame, an insulation member carried by said frame and having a recess provided therein for a case, an arbor having a recess therein for carrying a contact thereon, means engaging said arbor and securing it to said frame for reciprocation to and from association with a case positioned in said recess of said insulation member, means operatively engaging said arbor to deposit a contact thereon when said arbor is out of engagement with a said case on said insulation member, said arbor being positioned to be moved into and out of a case on said insulation member, welding means operatively associated with said frame and a case on said insulation member to engage opposite portions thereof adjacent a said contact positioned within a said case to weld said contact to said case at a flattened area thereof, controlled air blast means connecting to said insulation member at said recess to force a case therein up out of said recess when actuated, and a controlled discharge air blast means associated with said insulation member to blow a case from said insulation member when forced up from said recess to discharge said case.

7. Apparatus as in claim 4 where said weld means includes a weld head movable to and from association with said member, said contact depositing means including a contact storage hopper, and a device is secured to said weld head and is moved into and out of said contact storage hopper for contact stirring action when said weld head moves to and from association with said member.

8. A method of securing a contact within a tubular metal case having a closed end and an open end and having an inwardly offset flattened area comprising the steps of moving a contact into a case from the open end thereof to engage the inner surface of the flattened area, retaining the contact in a fixed position within and in contact with the flattened area of said case, and passing electrical current through said case and contact to weld said contact to said case on the inner wall of the flattened area thereof.

9. In apparatus for welding a contact within a case, means to receive and position a case, reciprocable means positioned adjacent said first-named means to receive a contact and move it into a positioned case, control means operatively connected to said reciprocable means to move it through an operative cycle, weld means operatively associated with said first-named means to weld a contact to an inner wall of said case when actuated, switch means operatively associated with said reciprocable means and closed by movement thereof towards a case, a power supply, said switch means connecting said power supply to said weld means to actuate said weld means when closed, air blast means connected to said first-named means to blow a case therefrom when actuated, and a second control switch connecting to said air blast means and being operatively associated with said reciprocable means for closing action to actuate said air blast means when said reciprocable means move away from said positioning means.

10. Apparatus for welding a contact within a case, means to position a case, reciprocable means to receive a contact and move it into a positioned case, control means operatively connected to said reciprocable means to move it through an operative cycle, weld means operatively associated with said first-named means to weld a contact to an inner wall of said case when actuated, switch means operatively associated with said reciprocable means and actuated by movement thereof towards a case, a power supply, said switch means being connected to said power supply and to said weld means to actuate said weld means when said switch means is actuated, and a second control switch operatively associated with said weld means to be actuated as said weld means complete an operative cycle, said second control switch being operatively connected when actuated to said reciprocable means to move it away from said first-named means.

11. A method of securing a contact within a tubular metal case having an integral permanently closed end and an open end and an inwardly offset flattened area to provide a reduced diameter bore section therein, comprising the steps of axially moving a contact into a case from the open end thereof to slide over and engage said flattened area, retaining the contact in engagement with such portion of said said case, and passing electrical current through said case and contact to weld said contact to said case on the inner wall of the flattened area thereof.

12. Apparatus for welding contacts within a case and comprising a frame, a member operatively carried by said frame and having a seat provided therein for a case, a second member for carrying a contact thereon, means engaging one of said members and operatively securing it to said frame for reciprocation to and from association with the other of said members to position the second member within and out of a case on said first member, means operatively engaging said second member to deposit a contact thereon when it is out of engagement with a said case on said first member, and means operatively with said frame and a case on said first member to engage opposite portions thereof adjacent said contact positioned within a said case to pass electrical energy through said case and said contact to secure said contact to said case.

13. Apparatus for welding contacts within a case and comprising a frame, a member carried by said frame and having a seat provided therein for a case, a second member for carrying a contact thereon, reciprocable driven means engaging one of said members and operatively securing it to said frame for reciprocation to and from association with the other of said members to position the second member within and out of a case on said first member, means operatively engaging said second member to deposit a contact thereon when it is out of engagement with a said case on said first member, and weld means operatively associated with said frame and a case on said first member to engage opposite portions thereof adjacent said contact positioned within a said case to pass electrical energy through said case and said contact to secure said contact to said case, said weld means including control switches, a power supply, and circuit means connecting said control switches and power supply together to control said reciprocable means and said weld means to provide automatic cyclic weld action in the apparatus.

References Cited in the file of this patent
UNITED STATES PATENTS

| | | |
|---|---|---|
| 2,078,694 | Smith | Apr. 27, 1937 |
| 2,197,058 | Roberts | Apr. 16, 1940 |
| 2,709,732 | Davis | May 31, 1955 |
| 2,740,876 | Zoschg | Apr. 3, 1956 |